United States Patent
Crawford et al.

[15] 3,662,918
[45] May 16, 1972

[54] REINFORCED SEPTIC TANK

[72] Inventors: David D. Crawford, 1601 North Oak Street; John W. Elvington, 605 Mesquite, both of Mineral Wells, Tex. 76067

[22] Filed: Aug. 24, 1970

[21] Appl. No.: 66,264

[52] U.S. Cl................................220/85 R, 210/532, 220/5 A, 220/18
[51] Int. Cl......................................................B65d 87/10
[58] Field of Search................220/1 B, 5 A, 18, 42 C, 72, 220/85 R, 855; 52/19, 20, 21; 210/169, 170, 532; 285/158, 189, 201, DIG. 16

[56] References Cited

UNITED STATES PATENTS

| | | | |
|---|---|---|---|
| 2,673,459 | 3/1954 | Overhulse | 52/19 X |
| 2,787,397 | 4/1957 | Radford | 220/72 X |
| 3,115,281 | 12/1963 | Somme | 220/72 X |
| 3,109,813 | 11/1963 | Bergsten | 210/532 |
| 3,221,881 | 12/1965 | Weiler | 210/532 X |
| 3,241,701 | 3/1966 | Boggs | 220/5 A |

FOREIGN PATENTS OR APPLICATIONS 1,043,819   11/1953   France..........................220/1 B

*Primary Examiner*—George E. Lowrance
*Attorney*—Wayland D. Keith

[57] ABSTRACT

A septic tank, which may be converted into a grease trap. The tank is preferably made of plastic reinforced with fiber glass and it is further reinforced due to the construction. The tank is light weight, therefore easy to install, is durable and resistant to corrosion due to ground moisture, and will not deteriorate because of exposure to acids and alkalies. The cover of the present tank interfits with the tank in fluid tight relation. It is readily converted into a grease trap by the addition of an extension onto the outlet pipe which extends downward into the tank.

8 Claims, 5 Drawing Figures

Patented May 16, 1972

3,662,918

DAVID D. CRAWFORD
JOHN W. ELVINGTON
INVENTOR

BY

*Wayland D. Keith*
THEIR AGENT

3,662,918

REINFORCED SEPTIC TANK

BACKGROUND OF THE INVENTION

This invention relates to a septic tank which may be converted into a grease trap and more particularly to a septic tank or grease trap constructed of plastic reinforced with fiber glass.

Various septic tanks have been proposed heretofore, but these, for the most part, were constructed of heavy steel plates, concrete, bricks or the like, and were expensive to make and it usually took several men to handle these tanks in the loading and unloading and setting thereof.

The present tank is so constructed as to be light in weight, the cover of which can be sealed thereon in fluid tight relation. The septic tank is constructed of relatively thin plastic reinforced with fiber glass, and is so constructed that panels form sides thereof, with the adjacent edges of the panels forming corners to increase the strength thereof. The top is ribbed and contoured to complementary seal the upper portion of the reservoir of the septic tank or grease trap.

OBJECTS OF THE INVENTION

An object of the invention is to provide a septic tank or grease trap of plastic reinforced with fiber glass to present a light weight tank which is easy to handle.

Another object of the invention is to provide a polygonal tank, the corners of which will form reinforcements, thereby preventing the collapse of the tank.

A further object of the invention is to provide a septic tank which is convertible into a grease trap, by the addition of an outlet extension to the outlet pipe on the inside of the tank.

A still further object of the invention is to provide a plastic septic tank or grease trap that is reinforced with plastic, which tank or grease trap is relatively low in cost of construction, light in weight, easy to install and remove, and which is resistant to deterioration from alkalies, acids and erosion.

DETAILED DESCRIPTION OF THE DRAWINGS

With these objects in mind and others which will become manifest as the description proceeds, reference is to be had to the accompanying drawings in which like reference characters designate like parts in the several views thereof in which.

Figure 2:
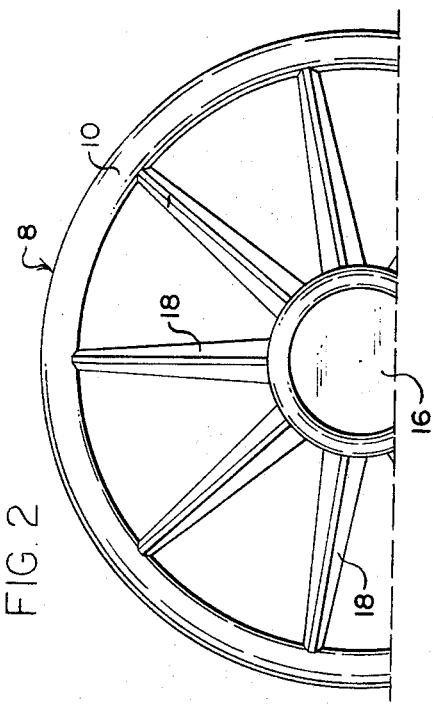
FIG. 2 is a fragmentary top plane view of the septic tank, showing the reinforcing ribs radiating from a clean-out hole in the top thereof.
Figure 4:
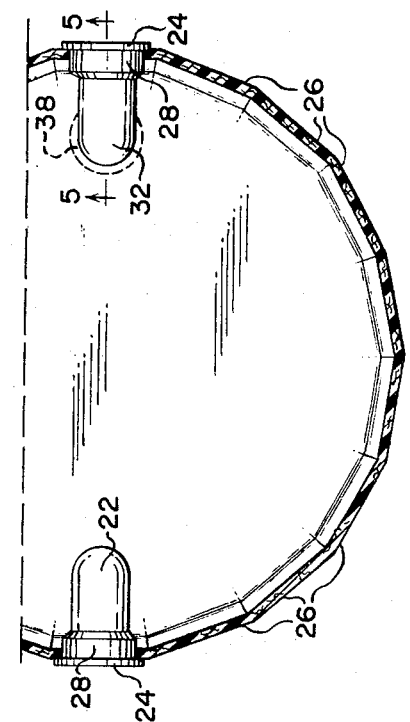
Figure 5:
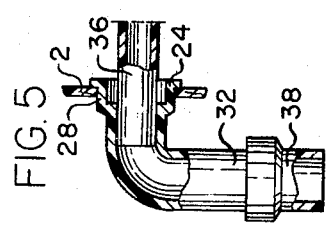
Figure 1:
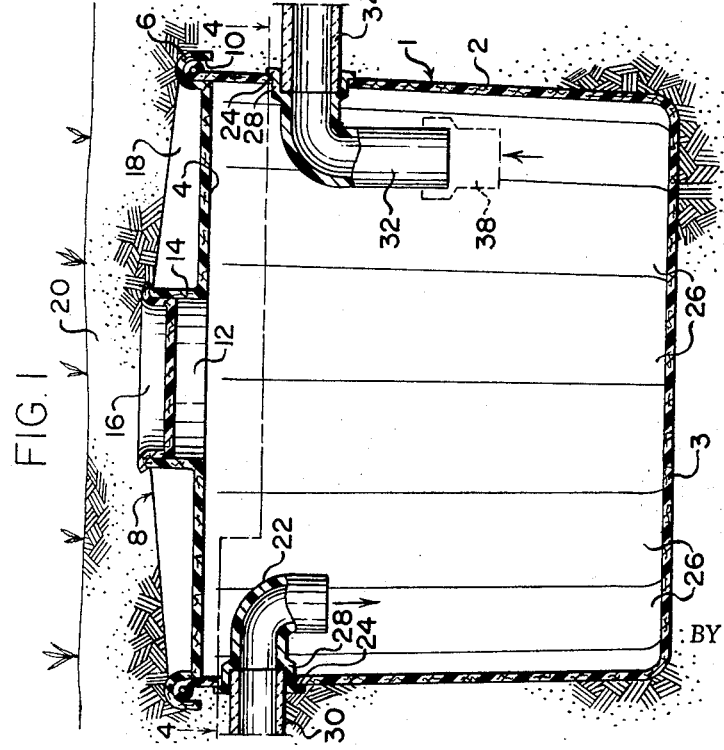
FIG. 1 is a vertical, sectional view taken through the septic tank, as installed within the ground, showing an extension on the outlet pipe in dashed outline to convert the tank into a grease trap.
Figure 3:
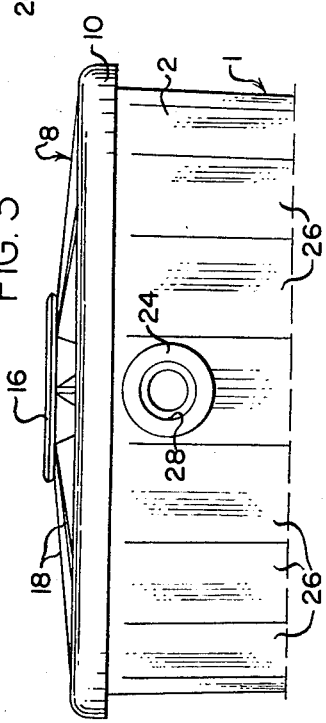
FIG. 3 is a fragmentary, side elevational view of the top portion of the septic tank or grease trap, taken at right angles to FIG. 1, and showing the inlet thereof.

FIG. 4 is a fragmentary, sectional view taken on line 4—4 of FIG. 1, looking in the direction indicated by the arrows; and FIG. 5 is a fragmentary, sectional view taken on the line 5—5 of FIG. 4, looking in the direction indicated by the arrows, showing an extension on the lower end of the outlet pipe to enable the septic tank to be converted into a grease trap, and further showing how a plastic pipe may be connected thereto.

DETAILED DESCRIPTION OF THE INVENTION

With more detailed reference to the drawings, the numeral 1 designates generally a septic tank assembly or grease trap which is made of plastic, which plastic is reinforced with fiber glass. The tank may be made in various heights or elongated transversely so as to give a reservoir of the desired capacity. One of the characteristics of the present tank is that it is made of relatively thin plastic material that is reinforced with fiber glass, and which tank is polygonal in shape, with adjoining edges of the polygonal panels forming corners, which adds reinforcement to the tank 2. The tank 2 has a bottom 3 formed therein. The top of tank 2, as indicated at 4 is cylindrical in form, and has an outwardly rolled rim 6 thereon to form a reinforcement for the tank and to enable a cylindrical cover, generally designated at 8, to be fitted thereon. The cover 8 has an annular recess 10 therearound which fits over the rolled rim 6 to form a fluid tight juncture between the rim 6 and the cover 8, both interiorly of tank 2 and exteriorly of rolled rim 6.

The cover 8 has a central opening 12 formed therein, which opening is sufficiently large to enable a suction hose to be placed thereinto to remove the sediment and fecal matter from the tank 1 when it is used as a septic tank, or to permit removal of grease therefrom when the tank is used as a grease trap.

The opening 12 has an upstanding collar 14 therearound, which is adapted to receive an interengaging cap 16 in fluid tight relation. The cap 16 may be readily removed and replaced with a minimum disturbance of the vegetation which is usually planted over septic tanks, grease traps and the like. The cover 8 has reinforcement ribs 18 formed on the top thereof, which radiate outward from the upstanding collar 14 to connect with the periphery of the cover 8, in the region of annular recess 10, so when the cover 8 is fitted on tank 2 in sealing relation, and when the cap 16 is seated in collar 14 in sealing relation, an earth fill 20 may be used to cover and to obscure the septic tank, which earth fill also forms a weighting media to maintain the septic tank or grease trap in place once it is connected.

An inlet pipe 22 is provided at one side of the tank 2 at an elevation near the top of tank 2. This inlet pipe is also made of plastic, which is reinforced with fiber glass and which has an out-turned flange 24 thereon, which flange seats against one of the plane facets 26 of the tank 2, so that the flange 24 may be cemented thereto to form a fluid tight joint. The inlet pipe 22 has a bell connection 28 to receive an end of a conventional soil pipe 30, as will best be seen in FIG. 1, which soil pipe is connected in the usual manner connecting soil pipes to septic tanks. The inlet pipe 22 is down-turned to discharge the sewage and the like into the tank 2.

The solids settle to the bottom, with the effluence passing out from a lower level through outlet pipe 32 into the discharge pipe 34, that interfits within the bell fitting 28, which is similar to the bell fitting on inlet pipe 22. The fitting 28 is flanged, as indicated at 24, to enable the cementing of the flange 24 to a plane facet of a panel 26, as shown in FIG. 4.

A tank of this construction may be readily fitted in a hole, of proper depth, in the earth, by a single workman and the fittings connected thereto in a minimum of time.

MODIFIED FORM OF ADAPTATION

While FIG. 1 shows the septic tank or grease trap 1 installed with the conventional clay pipe 34 connected to the inlet fittings 22 and the outlet fitting 32 are so constructed that plastic pipe 36 may be fitted in fluid tight relation within the inner diameter thereof, particularly as shown in FIG. 5. This construction is an alternate form of connection and the particular inlet and outlet fittings 28 may receive either plastic pipe, such as indicated at 36, or soil pipe, such as indicated at 30 and 34, without having to change fittings on tank 1.

GREASE TRAP ADAPTATION

The present tank 1 is adaptable for use as a grease trap, by the attachment of a fitting 38 on the lower end of outlet pipe 32 that extends into the tank so that the fluid from the grease trap will be discharged at a lower level than by outlet pipe 32 to enable grease to accumulate in the upper portion of the grease trap. The grease may be removed by the removing cap 16, and pumping the grease from the tank in the usual manner.

Having thus clearly shown and described the invention, what is claimed as new and desired to be secured by Letters Patent is:

1. A reinforced septic tank construction comprising:
    a. a unitary plastic tank reinforced with fiber glass and having an enclosing said wall and a bottom wall, b. at least two conduits connected in fluid communication with the interior of said tank and having downturned ends terminating at different levels within said tank, c. a cover fitted on said unitary plastic tank,
1. said cover having an opening formed therein centrally thereof, which opening is of less diameter than said cover,
2. reinforcing ribs radiating from said opening in said cover and terminating adjacent the periphery thereof,
3. a removable closure fitted in said opening in said cover.

2. A reinforced septic tank construction, as defined in claim 1; wherein
a. said cover has an annular, peripheral recess formed in the lower side thereof,
b. said peripheral recess in said cover is formed by downwardly extending portions of said cover both exterior and interior of said tank, and
1. said tank having a rounded edge at the top thereof to be complementally received into said downturned portions of said cover.

3. A reinforced septic tank construction, as defined in claim 1; wherein
a. said opening, formed centrally of said cover, has an upstanding annular wall therearound to form a neck, which neck is in communication with the interior of said tank, and
b. said closure being complementally fitted within said upstanding neck.

4. A reinforced septic tank construction, as defined in claim 1; wherein
a. said unitary plastic tank has plane faces joined to form angular reinforcing corners for a portion of the height thereto to for a polygonal tank.

5. A reinforced septic tank construction, as defined in claim 4; wherein
a. each said conduit connected in fluid communication with the interior of said tank has a flange on the outer end thereof,
b. each said flange adapted to be in abutting relation with a plane face of said polygonal tank, when fitted within said tank, and
c. each said flange being bonded to said respective plane faces, when fitted in place.

6. A reinforced septic tank construction, as defined in claim 5; wherein
a. each said conduit connected in fluid communication with the interior of said tank having a large outer recess formed therein to receive one size pipe in fluid tight relation, and
b. said pipe being of a different diameter immediately inward from said outer recess to complementally receive pipe of another size in fluid tight relation therewith.

7. A reinforced septic tank construction, as defined in claim 1; wherein
a. said conduits connected with the interior of said tank are ells, and each is of unitary plastic construction,
b. each said conduit having a flanged outer end adapted to fit in complementary relation with a side of said plastic tank, which is reinforced with fiber glass, and
c. each said conduit having an outer recess formed therein, which recess is adapted to receive one size pipe thereinto in fluid tight relation, a portion of the conduit connected within said recess having another diameter to receive a pipe of a smaller diameter in fluid tight relation.

8. A reinforced septic tank construction, as defined in claim 7; wherein
a. one of said downturned conduits in said tank is adapted to receive a tubular extension on the lower end thereof to convert said plastic tank into a grease trap.

* * * * *